UNITED STATES PATENT OFFICE.

WALTER O. SNELLING, OF PITTSBURGH, PENNSYLVANIA.

PROCESS OF TREATING VULCANIZED OILS AND PRODUCT THEREOF.

1,315,246.

Specification of Letters Patent. Patented Sept. 9, 1919.

No Drawing. Application filed May 22, 1915. Serial No. 29,765.

*To all whom it may concern:*

Be it known that I, WALTER O. SNELLING, a citizen of the United States, and a resident of Pittsburgh, in the county of Allegheny and State of Pennsylvania, have invented a new and useful Improvement in Processes of Treating Vulcanized Oils and Product Thereof, of which the following is a specification.

My invention relates to the manufacture of new and technically valuable plastic and elastic sulfurized products from vulcanizable oils.

The general object of my invention is to provide a process of controlling the cohesiveness and other physical properties of colloidal substances by varying their state of colloidal aggregation. More particularly, my object is to effect such colloidal changes in sulfurized oils as will impart to these substances any desired degree of coherence and plasticity, within wide limits. The products of my process range from kneadable elastic solids, through soft plastics, to semi-liquid and liquid masses, and their specific properties and applications may be varied to an almost unlimited degree by suitable choice of reagents and manipulations, as will hereinafter more fully appear.

When a vulcanizable oil, particularly a vegetable oil, is treated with sulfur, sulfur chlorid, or an equivalent sulfurizing agent, a solid, somewhat elastic substance results, and such substances, under the general name of factis, have found considerable utility as rubber substitutes and rubber fillers. They are crumbly and non-cohesive, and possess substantially no plasticity.

I have discovered that sulfurized oil products of the factis type may be rendered plastic and soft to any desired extent by means of suitable reagents, applied in particular ways, and also that vegetable oils may be sulfurized initially under such conditions as to produce plastic bodies of definite and readily controlled degrees of plasticity and softness.

My investigations indicate that the cohesiveness of a substance is a function of its state of molecular aggregation, and that separate, isolated molecules do not exist in colloidal substances such as caoutchouc, glue, factis and the like. Instead, it seems probable that each molecule is linked to other molecules, and these others to still additional molecules, so that the whole mass may form, in effect, one great molecular aggregate, without division into true separate molecules or even into separate molecular aggregates of ordinary colloidal size. The combining affinities, or valences, that effect such molecular linkage may be akin to the well-understood atomic valences of crystalloidal substances, or they may be valences of a more obscure type. These molecular valences may be present in only sufficient number or strength to hold the colloidal aggregates together, in which case the mass is not cohesive; or the colloidal aggregates may possess free or residual valences and may therefore be capable of attracting one another, in which case the mass is cohesive, in proportion to the number of such residual valences. Masses of the latter class of substances, in which residual valences are present, may be combined by merely pressing their surfaces together, and this is a well-known property of caoutchouc, tar, and many other colloidal substances.

Plastic, kneadable colloids, such as caoutchouc, must possess residual valences to a very high degree. It follows, therefore, that a colloidal substance which is not cohesive or plastic may be given these properties by breaking down its molecular aggregates into aggregates of smaller size, having free or residual valences. Conversely, a naturally cohesive colloid, or one prepared by breaking down the large molecular aggregates of a normally non-cohesive colloid, may be rendered less cohesive, or even entirely non-cohesive, by combining its relatively small molecular aggregates into larger aggregates having but few residual valences, or none at all.

The process to be specifically set forth herein consists in applying the foregoing theoretical considerations to the treatment of sulfurized polymerizable oils, especially sulfurized vegetable oils, which, normally, as stated above, are solid colloids, lacking in cohesiveness and plasticity. Considering a sulfurized oil product of the factis type to be a molecular complex of relatively infinite size, within which all the molecular valences are satisfied in some manner, I proceed, by means of suitable reagents, to break down this complex into molecular aggregates of smaller and smaller size. This disintegrating process results in a corresponding increase in the plasticity and softness of the product, until finally, if the process is continued to a sufficient extent, a liquid may be produced. Such a liquid product appears to represent the end point of the colloidal disintegration, and to consist of almost free molecules, or perhaps of small colloidal groups of a few molecules each. In the solid starting material there are practically no free or residual valences, and therefore little or no cohesion between fresh surfaces. In the disintegrated condition, each of the small colloidal aggregates possesses many residual valences, and accordingly, the mass is highly cohesive.

The disintegrating process may be interrupted, if desired, at any stage short of complete liquefaction, and when the process is thus interrupted, I prefer to remove any excess of the disintegrating or depolymerizing reagents, by washing or otherwise. Having carried the disintegration to completion, or to any desired degree, I may reverse the process and progressively recombine the small molecular aggregates into larger aggregates, having fewer residual valences. This reverse or hardening process may even be continued until non-cohesive, factis-like masses are again produced. By suitably varying the conditions under which the reactions take place, I am able to obtain an almost unlimited number of different products, which are distinguished from one another in their physical properties, especially in their softness and plasticity. Instead of using solid sulfurized products as starting materials, I may obtain the same results by directly sulfurizing oils under such conditions that relatively small colloidal aggregates are formed, plastic products being thereby produced.

The disintegrating or softening process may conveniently be termed depolymerization, and the reverse or hardening process may be correspondingly termed polymerization. In the present specification and claims, the terms polymerizing, depolymerizing and the like are to be understood as referring to the changes in physical properties described above, and it is also to be understood that these terms are not limited to the foregoing statements of theory, or to any particular theory of chemical rearrangement.

Many methods may be employed for carrying my process into effect, and such methods may be divided into three rather dissimilar groups, as follows:

A. I mix a vulcanizable oil (linseed oil, cotton seed oil, soya bean oil, castor oil, corn oil, sesame oil, etc.) with a material capable of promoting or assisting depolymerization, such as an alcohol, a hydroxy-fatty acid or any one of the reagents which will be enumerated more fully below. To this mixture I add sufficient sulfur chlorid to bring about the vulcanization of the vegetable oil used. I allow the vulcanized mixture to solidify, suitably in the form of a thin film, and I prefer to leave this film for several days at room temperature, after which I heat the film moderately, preferably by boiling in water for a number of hours. A soft, plastic product results, the consistency and other properties of which vary in accordance with the proportions of the ingredients used, and the length of the boiling treatment. Products may be thus obtained which closely resemble gum chicle, and which may be used for similar purposes, particularly in the manufacture of chewing gum.

B. In the second process, or group of processes, I first make a solid sulfurized oil product, or factis, by reacting upon a vulcanizable oil with sulfur chlorid or other vulcanizing agent. Preferably, I add a small amount of alcohol or other depolymerizing substance while making this factis, but the quantity may be much less than in process A, and the depolymerizing agent may even be omitted entirely. In either case, I confine the freshly made factis-like product in such a manner that the vapors which are given off from it are retained in contact with the solid factis. I allow the factis to remain in contact with the vapors given off, preferably under super-atmospheric pressure, for several hours. Under these conditions, the mass changes in color and in physical consistency, and instead of a light tan solid it usually becomes a dark brownish-green fluid or semi-fluid mass. I treat this dark sticky fluid or semi-fluid mass with cold water, and pass it between rolls so as to bring fresh water into contact with every part of it. Under this treatment with water, the dark mass changes to a light colored, plastic, rubber-like product.

C. In the third modification of my process, I begin, as in process B, by making a solid vulcanized oil product, or factis, in which no alcohol or other additional material need be introduced. Ordinary commercial factis, either fresh or old, may likewise be used as the starting material. The factis, however prepared, is brought into contact with the vapors of sulfur chlorid, preferably by placing the factis in a closed jar, pouring a little sulfur chlorid into the jar, and maintaining the temperature at a suitable point to insure that the jar is filled with sulfur chlorid vapors. In a few hours, the factis softens and darkens, and then rapidly changes to a very dark colored liquid, which is but slightly viscous, and may even be practically as fluid as water. I now treat this liquid with water. A decided change ensues, accompanied by vigorous chemical reaction and the liberation of much heat. The dark colored liquid, which probably represents the end point in the progressive depolymerization of factis, and in which the colloidal particles have been so reduced in size that the whole mass can no longer exist as a solid, now undergoes a rapid repolymerization, with increase in the size of the colloidal aggregates. Within the space of one or two hours, the dark, liquid depolymerization product becomes repolymerized to a light colored plastic mass, the properties of which depend upon the various physical conditions which have been present during the depolymerization and repolymerization stages of the process.

In all of the foregoing processes, too great heating during the vulcanizing stage tends to yield dark colored products, and therefore, it is generally desirable to use a small amount of a diluent to keep the temperature within moderate limits. Carbon bisulfid and gasolene are suitable diluents for this purpose. Instead of adding a diluent, all the components of the vulcanizing mixture may be well cooled before mixing, or the mixing may be done in a cooled tube, or similar device.

As indicated above in connection with the first two groups of processes, I have discovered that certain substances assist in the depolymerization of sulfurized oils. A considerable number of substances are suitable for this purpose, but at present I prefer to employ carbon compounds containing hydroxyl groups or sulfo-groups or gaseous or vaporous bodies containing chlorin, such as hydrochloric acid or sulfur chlorid. Of the hydroxylated bodies, I have found that the aliphatic alcohols, such as methyl alcohol, ethyl alcohol, amyl alcohol and alcohols of high molecular weight, are excellent agents for this purpose, as well as the higher hydoxy-acids, such as hydroxystearic acid and hydroxystearosulfuric acid. These bodies yield mainly light-colored products. Of the bodies containing sulfo-groups, I find that sulfonated oleic acid and similar sulfonated acids are desirable for my purpose. They yield dark-colored products, which may be bleached by means of chlorin, sulfur dioxid, sodium hypochlorite, nitric acid and other bleaching agents.

In addition to the preferred agents enumerated above, I may also use certain unsaturated hydrocarbons, amylene for example. Oil vapors passed through a highly heated tube, particularly when under reduced pressure, yield a distillate that may be used to assist depolymerization in my process. For example, the addition to the vulcanized oil of highly "cracked" hydrocarbons having a boiling point of 150° C. and 200° C. yield films which soften and become cohesive on long standing in a warm room or on boiling in water for two or three days. Hydrochloric acid vapors and vapors of sulfur chlorid also promote depolymerization, as indicated in process B, described above.

Proceeding to a more detailed description of my process, I shall discuss several specific and detailed examples, in order that the materials and manipulations necessary to the various modifications of the process may be clearly understood. These examples are given by way of illustration only, and are not to be construed as limiting my invention to the details therein set forth.

In process A, outlined above, the essential factors are a vulcanizable oil, a vulcanizing agent, and an additional assisting material such as an alcohol. It is desirable that the factis-like film be allowed to rest or "cure", and that the film may be boiled in water, but these steps are not indispensable, and either step may be shortened or omitted entirely if the other is lengthened proportionally, or if other conditions are suitably changed. This modification of my process may be carried out as follows:

To 34 c. c. of cottonseed oil I add 23 c. c. of carbon bisulfid. The two liquids are perfectly miscible, and form a clear solution. To this clear solution I add 26 parts of denatured alcohol, and stir vigorously, to produce as complete an emulsion as possible. Into this emulsion, with continued stirring, I pour 17 c. c. of sulfur chlorid, and I continue stirring, after adding the sulfur chlorid, to cause it to become as perfectly mixed as possible with the other constituents. Heat is evolved as soon as the sulfur chlorid is added, and in from ten to twenty seconds after adding the sulfur chlorid, the mix will be quite warm, and will show a slight tendency to boil. At this stage the material is poured upon a cold glass plate, in a film from one to two millimeters in thickness. This film is allowed to remain on the glass plate, just as it was poured, for four days in a room at about 16° C. At the end of this curing period of four days, the film is placed in a vessel filled with water, and is then heated to 100° C., this temperature being maintained from five to seven hours. At the end of this period of heating, the film will be found to be very different in physical consistency from its condition when heating was commenced, and will form a soft, cohesive mass of remarkable plasticity. The plastic mass is run between friction rolls, while being washed with a constant stream of fresh water. After eight or ten passages through the rolls, it will be sufficiently washed, and will be in the form of a soft, plastic sheet, ready for use for any of the purposes for which a plastic mass of this consistency is desired. For example, it is in excellent condition for use as a chewing material, and may be used to form a chewing gum, preferably after the addition of suitable fillers, flavoring agents, etc. I find that finely pulverized resins, stearone, and other water-insoluble organic materials are suitable fillers for this purpose.

Many of the products made according to my invention, and particularly those products made according to modification A, just described, using hydroxystearic acid or a sulfonated oleic acid as the depolymerizing agent, give caoutchouc-like products which may be used to advantage as rubber fillers or rubber substitutes, and also for many purposes for which caoutchouc has heretofore been employed. For example, an excellent substance for book-binders' use, in picking up surplus gold leaf from the bindings, may be thus produced, and it is also a very serviceable erasing medium or art gum for draftsmen's use. These products are also vulcanizable, and when mixed with sulfur and heated within the temperature range ordinarily used in the vulcanization of rubber, give tough, non-plastic, somewhat elastic bodies, very similar to certain grades of ordinary vulcanized rubber. When higher percentages of sulfur are used, hard, non-extensible, brittle bodies are produced, quite similar to the material commonly known as vulcanite or hard rubber.

The modification B of my process, in which factis is confined in contact with its own vapors, may be divided into two sub-modifications. In the first of these, no alcohol or other depolymerization-assisting material is used at any stage of the process, while in the other, a small amount of an hydroxylated compound, or other depolymerizing assistant, is added to the factis-like mix. These two sub-cases of process B will now be discussed in their turn.

The essential factors of the first sub-case, in which no depolymerizing reagent is employed, are a vulcanizable oil, a vulcanizing agent, and the steps of retaining the vulcanized oil product, in contact with the vapors which it gives off or in contact with equivalent vapors from an outside source, during a curing period of a few hours or longer, and bringing the depolymerized product so formed into contact with water, to bring about repolymerization and to form a plastic or elastic mass. A diluent such as carbon bisulfid or gasolene may be used to moderate the vulcanizing reaction, and the amount of this diluent, as well as the amount of the vulcanizing agent, may be varied within rather wide limits. The confining of the film may be accomplished in any suitable manner. The use of a closed jar is not essential, if the film is packed together in large masses, so that the upper layers prevent the escape of the vapors formed, or if the mass is covered with a layer of sand or the like. The application of moderate pressure, and the use of rather small, closed jars, serve to shorten the necessary curing period, and the depolymerization may be interrupted at any desired stage. The mass is exposed to air or water, preferably the latter, unless the material is desired in its fluid depolymerized condition. This process may be carried out as follows:

40 c. c. of cottonseed oil, 20 parts of carbon bisulfid, and 40 parts of sulfur chlorid are mixed carefully together. These three liquids mix perfectly, but it is best to continually stir during the mixing period. Heat is very slowly evolved, and after three or four minutes it will be noted that the liquid, which up to this time has been quite fluid, begins to become viscous. It is now poured out on a cold glass plate, in a film from one to two millimeters thick. Fifteen to twenty minutes after pouring this film, it will be found sufficiently firm to bear handling, and it should then be placed within a closed vessel, where it may remain in contact with the vapors which it gives off. The film should remain in the curing vessel about three days, in a room at about 17° C. At the end of this time, the film will have broken down to a dark green, very viscous semi-liquid mass. This is brought in contact with water, and kneaded in the presence of a constant supply of fresh water. The dark green, almost black viscous liquid will rapidly lighten in color, and in about ten minutes will form a somewhat yellowish, plastic mass. At this stage the plastic, light colored product is passed repeatedly between rolls, and is washed with a constant stream of fresh water. After about five minutes' treatment in this way, a light colored, plastic sheet will be produced, suitable for use as a rubber substitute, a filler for rubber goods, etc.

The essential conditions of the second sub-case of process B, in which an hydroxylated substance or other like agent is present, are quite similar to those discussed in connection with the first sub-case. The products, however, may be quite different, as light or dark colored liquids having very unique and valuable properties may be produced by this process. The manipulations may suitably be as follows:

40 c. c. of cottonseed oil is mixed with 24 c. c. of carbon bisulfid, and to this mixture 16 c. c. of methyl alcohol is added, with constant stirring. To these three constituents, with continued stirring, 20 c. c. of sulfur chlorid is added and well mixed. Heat is rapidly evolved, and in from ten to twenty seconds the liquid is poured out on a glass plate, in the form of a thin film, say 1 millimeter thick. In about twenty minutes this film will have hardened, and it is then stripped from the glass plate, and placed in a closed jar, where it may be exposed to the vapors which it slowly gives off. In 24 hours, in a room at about 17° C., the film will have broken down to a dark colored fluid, of somewhat viscous nature. Water is added to this fluid, and it is stirred frequently, so as to bring the water in as intimate contact as possible with the heavy, dark colored liquid. After three hours, the dark colored, depolymerized liquid will have changed to a beautiful, tan colored product, which is fairly fluid in nature. This product, which possesses most desirable properties of cohesion, freedom from adhesion to wet surfaces, etc., forms a most desirable belt dressing, or may be mixed with organic fillers to form a chicle substitute, and it may be added to rubber, chicle, gutta percha, or any similar material for the purpose of desirably affecting the softness and plasticity of these bodies. This liquid, chicle-like product possesses properties which give it usefulness throughout a wide field of industrial manufacture.

Instead of the light-colored liquids which I have mentioned as the products of the process last described, I may produce bodies of different consistencies by varying the amount or the kind of the alcohol used. For instance, if 8 parts of methyl alcohol are used instead of 16 parts, as in the foregoing example, I obtain a light colored, soft and very plastic solid. By other similar variations in the depolymerizing agent, light-colored substances of any desired consistency may be produced, from tough plastics to non-viscous liquids.

In group C, the third main group of methods into which I have divided my process, the essential condition is the presence of factis in contact with sulfur chlorid, the sulfur chlorid being preferably, though not essentially, in the form of vapor. As indicated above, the factis may be new or old. If old, a longer treatment with sulfur chlorid is necessary. The details of a typical example are as follows:

Ordinary factis is made, as by mixing 67 c. c. of cottonseed oil, 16 c. c. of carbon bisulfid and 17 c. c. of sulfur chlorid, the constituents being added together, stirred carefully, and poured in a thin film on a plate of glass, as soon as the material shows signs of becoming quite viscous. About 30 grams of factis, made by this method, are placed in a small bottle, and 20 c. c. of sulfur chlorid are added, after which the bottle is closed by means of a glass stopper or other fairly tight-fitting means. After 48 hours, in a room at about 18° C., the factis film will be found to have softened, become very dark in color, and to have liquefied to a very viscous fluid. Water is added to this fluid, when it will be found to rapidly change in physical properties, warming considerably, and at first becoming much more viscous. After from 10 to 20 minutes' kneading with water, the dark colored fluid will have changed to an elastic, plastic, light colored mass. This mass is preferably run between friction rollers, exposed to a stream of water, and may thus be formed into a coherent sheet of a light colored elastic solid, very desirable for use as a chicle substitute, a rubber filler, or for any like purpose.

I may vary in many ways the conditions under which I apply the several processes described above, and by such variations I obtain products of different characteristics which are suitable for many different purposes. I may also make use of the several processes in combination to a greater or less degree, thereby obtaining still further variations in the resulting products. For example, I may make a factis-like film according to process A, exactly as described in my first specific example, and I may confine the film so made in a closed vessel, so that the film is exposed to its own vapors. In this way, I obtain a softer product than by the complete first method. In the methods which involve curing the factis-like films, long continued curing generally yields softer products, and when boiling in water is desirable, as in modification A of my process, the necessary time of boiling may be shortened by treating the material in an autoclave at from 30 to 60 pounds' pressure. Boiling in water is not usually desirable in methods B and C which I have described, since in many cases, the products of these methods, when boiled in water, will rapidly change over into ordinary non-plastic, factis-like masses. In some cases, however, I have first made products according to the process (method B, subcase 2) in which the factis mass, containing alcohol, is confined with its own vapors, using denatured ethyl alcohol instead of methyl alcohol. By this means, I obtain a soft, plastic solid instead of a liquid, as in the described case, and this plastic solid changes, on boiling from one to two hours, into a slightly sticky, dark-colored plastic mass, which forms a desirable softening admixture to caoutchouc. Longer boiling, say for eight hours, converts the material to a dark-colored rather sticky liquid.

I frequently find it desirable to use in conjunction with one another the products made according to the different divisions of my invention. In practice for example, I make rather tough products as by case A, and I then add to this product some of the semi-liquid material made by subcase 2 of process B. Of course I can add little or much, according to the softness and other characteristics of the final product desired. Because of the fact that the different products made by the different forms of my invention all possess a fundamental similarity of internal structure, they work together very readily, to form perfectly homogeneous products. It is often more convenient to make a product of any desired softness by rolling together suitable amounts of a softer and of a harder product, than it would be to attempt to formulate the exact mixture necessary to give the desired consistency of products. I may make use of this principle of admixture with products of the same class, and I also find it very convenient to add greater or less amounts of the product made by subcase 2 of process B to materials made by division C of my process, and similarly, I frequently add materials made by process A, to the product made by process B, subcase 1.

It is interesting to note that I can obtain products of almost any desired consistency, by either one of two quite different processes. In the one case, I start out with a suitable mixture to give as an end product a substance of the softness and plasticity desired. In the other case, I reach the same end by working together any two products produced from different steps in my invention, until I obtain a substance of suitable consistency, as by adding, for example, a liquid chicle-like product to a tough, difficultly plastic product, until I obtain a soft, perfectly homogeneous and very plastic substance.

It is very desirable that the sulfur chlorid, alcohol, or other substance which is used to promote depolymerization be present in only sufficient quantity to be consumed when the product reaches the desired consistency, or that any excess of such substance be removed. If an excess of the depolymerization reagent is left in the final product, further depolymerization may take place on long standing, and may change the properties of the product. Accordingly, the products, however prepared, should be thoroughly washed with water, which serves to decompose and remove any free sulfur chlorid that may be present, and which also will mechanically remove any free alcohol or other depolymerizing agent that may exist in the products.

The almost indefinite number of products that may be made in accordance with my present invention are useful for a large number of practical purposes, and, in general, they may be used wherever elastic or plastic substances are required. Their utility in the manufacture of chewing gum and as rubber substitutes and fillers has already been mentioned. Other valuable technical applications of my products are in making floor tile compositions, printing press rollers, shoe bottom fillers, cable insulation, belt dressings, and impregnated fabrics for waterproofing and electrical insulating purposes.

The liquid and semi-liquid products of methods B and C, and particularly the light liquid product of method B, subcase 2, are very desirable belt-dressing substances, and may be used as such without further treatment. Other effective belt dressing materials may be made by forming a chicle-like, plastic solid by any of the various methods described above, and extending this substance in a suitable solvent, such as gasolene, carbon tetrachlorid or chloroform. My products are scarcely soluble in any of the usual solvents, but, like caoutchouc, my chicle-like products swell up in some of them, and enter into pseudo-solution. All of these belt-dressings are very effective, giving to belts and their pulleys a desirable adhesiveness to each other by covering them with a thin layer of a solid, caoutchouc-like mass which is not sticky to the touch or harmful to the belt, as are the rosin mixtures usually employed for this purpose.

The plastic, kneadable property of my depolymerization products distinguishes them physically from ordinary factis, which is not kneadable at all. It is possible to produce a cohesive material by combining a vegetable oil, which is itself a sticky liquid, with just the proper amount of sulfur chlorid to partially vulcanize the oil; but such partially vulcanized semi-solid products are really very sticky liquids, and are entirely different in their constitution and properties from my depolymerization products of fully vulcanized or over-vulcanized oils.

My products are generally insoluble in water, odorless and tasteless. They may be softened by working them up with diluents and may be combined with suitable coloring matters and with numerous plastic and non-plastic substances to form a wide variety of plastic compositions.

It will be evident from the foregoing discussion that the range of modifications which may be effected in my process is very great. My invention is therefore to be understood as covering all equivalents of the materials and methods that have been specifically mentioned, and no limitations are to be imposed upon my invention except such as are indicated in the appended claims.

I claim as my invention:

1. The process that comprises depolymerizing a vulcanized oil and repolymerizing the product to a plastic material without additional vulcanization.

2. The process that comprises preparing a solid, substantially non-cohesive vulcanized oil product and transforming the said product into a plastic material without additional vulcanization.

3. The process that comprises sulfurizing a vulcanizable oil in the presence of a non-vulcanizing substance that is capable of assisting in the depolymerization of the sulfurized oil under subsequent treatment.

4. The process that comprises sulfurizing a vulcanizable oil in the presence of a substance that contains a hydroxyl group and is capable of assisting in the depolymerization of the sulfurized oil under subsequent treatment.

5. The process that comprises sulfurizing a vulcanizable oil in the presence of an alcohol that is capable of assisting in the depolymerization of the sulfurized oil under subsequent treatment.

6. The process that comprises preparing a solid body from a vegetable oil by the action of a vulcanizing agent and converting the said solid body into a liquid product by the action of a depolymerizing agent.

7. The process that comprises reacting upon a vulcanizable oil with a sulfurizing agent, exposing the resulting sulfurized product to a depolymerizing agent, and removing the excess of the depolymerizing agent when a product of a desired consistency has been formed.

8. The process that comprises sulfurizing a vulcanizable oil in the presence of a non-vulcanizing substance that is capable of assisting in the depolymerization of the sulfurized product, and warming the said sulfurized material.

9. The process that comprises reacting upon a vulcanizable oil with a sulfurizing agent and a substance that is capable of assisting in the depolymerization of the sulfurized product, the proportions of the said materials being such as to produce, when the sulfurized mass is heated, a plastic product, and heating the said sulfurized product until a product of the said consistency is obtained.

10. The process that comprises sulfurizing a vulcanizable oil in the presence of a substance that is capable of assisting in the depolymerization of the sulfurized product, and heating the resulting product at substantially 90° C. to 100° C.

11. The process that comprises sulfurizing a vulcanizable oil in the presence of a substance that is capable of assisting in the depolymerization of the sulfurized product, and boiling the resulting product in water.

12. The process that comprises sulfurizing a vegetable oil in the presence of a substance that is capable of assisting in the depolymerization of the sulfurized product, and curing the resulting product by allowing it to rest for a time.

13. The process that comprises sulfurizing a vegetable oil in the presence of a substance that is capable of assisting in the depolymerization of the sulfurized product, and curing the resulting product by allowing it to rest for several days.

14. The process that comprises sulfurizing a vegetable oil in the presence of a substance that is capable of assisting in the depolymerization of the sulfurized product, curing the resulting product by allowing it to rest for a time, and heating the cured material.

15. The process that comprises sulfurizing a vegetable oil in the presence of a substance that is capable of assisting in the depolymerization of the sulfurized product, curing the resulting product by allowing it to rest for a time, and boiling the cured product in water.

16. The process that comprises reacting upon a vegetable oil with sulfur chlorid, in the presence of an alcohol, curing the resulting product by allowing it to rest for a time, and boiling the cured product in water.

17. The process that comprises reacting upon a vegetable oil with sulfur chlorid, in the presence of a sufficient amount of depolymerization-assisting agent to produce, when the sulfurized mass is heated, a soft plastic product, and heating the said sulfurized mass until such a soft, plastic product is obtained.

18. The process that comprises reacting upon a vegetable oil with a sulfurizing agent in the presence of a sufficient amount of a depolymerization-assisting agent to produce, when the sulfurized mass is heated, a soft plastic product, and boiling the said sulfurized mass in water until such a soft, plastic product is obtained.

19. The process that comprises mixing a vegetable oil, a diluent and an alcohol, adding sulfur chlorid, agitating the mixture, pouring the mixture in a thin film upon a cold surface, curing the said film by allowing it to remain in place for about four days and boiling the cured film in water.

20. The process that comprises mixing a vegetable oil, a diluent, and an alcohol, adding sulfur chlorid, agitating the mixture, pouring the mixture in a thin film upon a cold surface, curing the said film by allowing it to remain in place for about four days, boiling the cured film in water until a soft, plastic product is obtained, washing the said product, and adding filling material thereto.

21. The process that comprises reacting upon a vulcanizable oil with a reaction product of sulfur chlorid and an hydroxylated compound that is capable of assisting in the depolymerization of vulcanized oil.

22. The process that comprises reacting upon a vulcanizable oil with a reaction product of sulfur chlorid and an alcohol that is capable of assisting in the depolymerization of vulcanized oil.

23. The process that comprises reacting upon a vulcanizable oil with sulfur chlorid, exposing the resulting mass to the action of a vaporous depolymerizing agent, and bringing the product into contact with water to interrupt the depolymerizing action when depolymerization has proceeded to a desired degree.

24. The process that comprises forming a factis-like vulcanized oil product by treating a vegetable oil with an agent capable of producing vulcanization at room temperatures and pouring the mixture in a thin film upon a cold flat surface, placing the said film in a closed vessel, allowing the film to remain in the said vessel until a dark semi-liquid mass is produced, kneading the said mass in the presence of water to form a coherent plastic material, and passing the said plastic material repeatedly between rolls while washing with fresh supplies of water.

25. The process that comprises reacting upon a vulcanizable oil with a vulcanizing agent in the presence of a substance capable of assisting in the depolymerization of the resulting product, and producing depolymerization of the said product by confining it in the presence of a vaporous reagent containing the same substances as those produced by the vulcanizing reaction.

26. The process that comprises confining a mixture of vegetable oil, sulfur chlorid and an alcohol in the presence of the vapors produced by their reaction and thereby producing a depolymerized vulcanization product.

27. The process that comprises reacting upon a vulcanizable oil with a vulcanizing agent in the presence of a substance capable of assisting in the depolymerization of the resulting vulcanized product, and producing depolymerization of the said product by confining the said product in the presence of the vapors produced by the vulcanizing reaction until a depolymerized vulcanization product is produced.

28. The process that comprises reacting upon a vulcanizable oil with a vulcanizing agent in the presence of a substance capable of assisting in the depolymerization of the resulting vulcanized product, and producing depolymerization of the said product by confining the said product under super-atmospheric pressure in the presence of the vapors produced by the vulcanizing reaction.

29. The process that comprises confining a mixture of a vulcanizable oil, a vulcanizing agent and a depolymerizing agent in the presence of the vapors produced by their reaction, and treating the resulting mass with water to remove any excess of dissolved or absorbed vapors.

30. The process that comprises mixing a vegetable oil, a diluent, and an alcohol, adding sulfur chlorid to the mixture, pouring the mixture in a thin film upon a cold surface, placing the film, when it solidifies, in a closed vessel, allowing the film to remain in the said vessel until it is transformed into a liquid, and bringing the said liquid into contact with water.

31. The process that comprises depolymerizing a vulcanized oil product by means of a non-metallic chlorid.

32. The process that comprises depolymerizing a vulcanized oil product by means of an excess of sulfur chlorid beyond the amount necessary to vulcanize the said oil.

33. The process that comprises reacting upon a vulcanized oil product with a depolymerizing agent containing a non-metallic chlorid, and washing out the excess of depolymerizing agent when the material has reached a desired consistency.

34. The process that comprises confining a vulcanized oil product in the presence of sulfur chlorid until a depolymerized vulcanization product is produced.

35. The process that comprises confining a vulcanized oil product in the presence of sulfur chlorid vapors until a depolymerized vulcanization product is produced.

36. The process that comprises preparing a vulcanized oil product by reacting upon a vulcanizable oil with an amount of sulfur chlorid greater than the amount necessary to vulcanize the said oil, and confining the resulting product in a closed vessel until a depolymerized vulcanization product is produced.

37. The process that comprises treating a vulcanized oil product with vapors of sulfur chlorid in a closed vessel until a liquid vulcanization product is produced.

38. The process that comprises treating a vulcanized oil product with vapors of sulfur chlorid in a closed vessel and treating the resulting product with an oxygen-containing fluid until a liquid vulcanization product is produced.

39. The process that comprises treating a vulcanized oil product with vapors of sulfur chlorid in a closed vessel and treating the resulting product with water until a liquid vulcanization product is produced.

40. The process that comprises treating a vulcanized oil product with vapors of sulfur chlorid in a closed vessel until a fluid mass is produced and maintaining the said fluid in contact with water until a plastic product is formed.

41. A vulcanized oil product that is similar in elasticity and plasticity to gum chicle.

In testimony whereof, I have hereunto subscribed my name this 20th day of May, 1915.

WALTER O. SNELLING.

Witnesses:
M. R. McKeown,
J. G. Kaiser.

It is hereby certified that in Letters Patent No. 1,315,246, granted September 9, 1919, upon the application of Walter O. Snelling, of Pittsburgh, Pennsylvania, for an improvement in "Processes of Treating Vulcanized Oils and Product Thereof," errors appear in the printed specification requiring correction as follows: Page 3, line 86, strike out the word "may;" page 8, claim 38, commencing with the word "and," line 101, strike out all to and through the word "fluid," line 103; same page and claim, line 104, as now numbered, after the word "produced" insert the words *and treating the resulting product with an oxygen-containing fluid;* same page, claim 39, commencing with the word "and," line 107, strike out all to and through the word "water," line 108; same page and claim, line 109, after the word "produced" insert the words *and treating the resulting product with water;* and that the said Letters Patent should be read with these corrections therein that the same may conform to the record of the case in the Patent Office.

Signed and sealed this 9th day of March, A. D., 1920.

[SEAL.]

Cl. 106—23.

M. H. COULSTON,

*Acting Commissioner of Patents.*